Aug. 27, 1968    MIKIO MATSUMOTO    3,398,990
APPARATUS FOR CHANGING A DIRECTION OF FLOATED
ARTICLES ON A FLOATING CONVEYOR
Filed May 17, 1967

Mikio Matsumoto
INVENTOR.

BY Wenderth, Lind
and Ponack
Attorneys

United States Patent Office 3,398,990
Patented Aug. 27, 1968

3,398,990
APPARATUS FOR CHANGING A DIRECTION OF FLOATED ARTICLES ON A FLOATING CONVEYOR
Mikio Matsumoto, Ashiya-shi, Japan, assignor to The Tsubakimoto Chain Mfg. Co., Ltd., and Nippon Sheet Glass Co., Ltd., both of Osaka, Japan
Filed May 17, 1967, Ser. No. 639,179
Claims priority, application Japan, June 16, 1966, 41/39,013
6 Claims. (Cl. 302—29)

ABSTRACT OF THE DISCLOSURE

The disclosed apparatus for changing the direction of floated articles on a floating conveyor has a pair of shafts spaced from each other and disposed vertically adjacent each other at a branching corner on a conveyor. Arms are mounted rotatably around said respective shafts and radially project therefrom. Other shafts are fitted at one end of said respective arms so as to move vertically and pads are mounted on the respective lowermost ends of said other shafts for contacting said loads so as to be able to change the direction of the loads on the conveyor.

Background of the invention

This invention relates to an apparatus for changing the direction of floated articles on a floating conveyor, and more particularly is directed to an apparatus for branching off flat bottom surface articles from a main conveyor upon which they are being carried to a sub conveyor which is provided with a plurality of air jet holes therethrough so as to float the articles on the conveyor by means of compressed air ejected through the holes.

Heretofore, floating conveyors in which a plurality of air jet holes are formed through a table so as to eject compressed air in order to float loads or flat bottom surface plates on the table and also so as to form an air-film layer on the surface of the table to carry the loads on the table in any desired direction with an extremely small frictional resistance have been utilized in very important situations in transferring flat plates such as glasses, plastics, etc.

In order to carry the flat bottom surface plates to their desired location, the direction of movement of the plates must often be changed and in some cases it is preferable to do so while the plates are in a moving state. However, since the plates moving on the air table have their inertia in the direction of their initial motion, said inertia being directly proportional to the acceleration of the loads, it is very difficult and sometimes impossible to satisfactorily change the direction of the moving plates due to the slip caused the loads which makes scratches on the surface thereof or due to the pressing forces against the surface of the air table.

Summary of invention

This invention eliminates the aforementioned disadvantages in the case where it is desirable to change the direction of the floated loads or flat bottom surface plates, and provides an improved apparatus for changing the direction of the moving plates floated on the air table so that the speed of the plates in their original direction is gradually decreasing while their speed in the new direction is gradually increasing.

It is an object of this invention to provide an apparatus for changing a direction of gas floated articles carried on a gas cushion conveyor in which the direction of said articles such as plate glasses or polished metal plates are easily and smoothly changed without any resultant scratches on the flat bottom surfaces of the articles.

Another object of this invention is to provide an apparatus for changing a direction of moving articles on a conveyor in which the direction of the article is changed while moving at the same peripheral speed as the original velocity.

A still further object of this invention is to provide an apparatus for changing the direction of moving articles on a conveyor in which the pads for moving the articles thereon are able to be independently turnable on the arms.

Still another object of this invention is to provide an apparatus for changing a direction of moving articles on a conveyor in which the direction of movement of various types of articles can be changed simply and easily.

A further object of this invention is to provide an apparatus for changing a direction of moving articles on a conveyor in which the direction of movement of the plates is automatically changed repeatedly and easily.

These objects are achieved by providing a pair of shafts spaced from each other and disposed vertically adjacent each other at a branching corner on a conveyor. Arms are mounted rotatably around said respective shafts and radially project therefrom. Other shafts are fitted at one end of said respective arms so as to move vertically and pads are mounted on the respective lowermost ends of said other shafts for contacting said loads so as to be able to change the direction of the loads on the conveyor.

It is an advantage of this invention that the direction of the article on the gas cushion conveyor can be changed without the application of a rapid or strong increase or decrease in the force at the branching portion by means of circular movement together with the floating action on the conveyor so as to reduce the friction therebetween.

Yet another advantage of this invention is seen in the fact that even though the article of the conveyor fluctuates while its direction is being changed or if it has various thicknesses, the absorption of the pads makes adjustment for this.

Another important advantage of this invention is seen in the fact that the article on the conveyor is adapted to have its direction of movement changed without any additional power consumption.

Furthermore, a still further advantage of this invention is seen in that when the article has its direction of movement changed by an application of the pads thereto there is no slip or rotation between the article and the pads due to the provision of the double bosses, inner and outer, on the shaft for supporting the pads.

Still another advantage of this invention is seen in that the direction of the article on the conveyor is changed without any resultant scratches on the bottom surface of the article and in that this operation may be carried out easily and automatically.

Still another advantage of this invention is seen in that the article on the conveyor is simply parallelogrammatically moved by means of the curved arms between which the connecting rod is movably secured to both arms at the curved portion.

Other objects and advantages of this invention will further become apparent hereinafter, and from the drawings.

*Description of the preferred embodiment*

Figure 1:
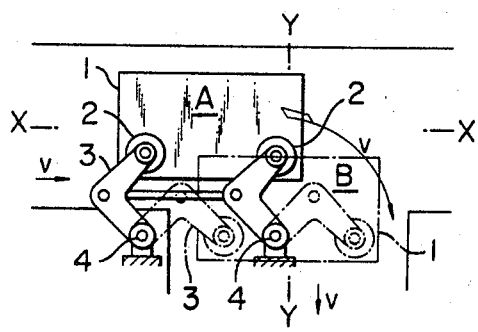
FIGURE 1 is an explanatory plan view showing an apparatus for changing the direction of movement of a moving article on a conveyor in accordance with this invention.

The principle of this invention whereby scratches or the like on the plates due to the inertia of the plate are avoided when the direction of the loads moving on the air table are changed will now be explained. If the speed of the load in the original direction on one air-film conveyor is V and if the speed to which the direction of the motion of the load is to be changed is equivalent to the original speed, and if the mass of the plate is identified by $m$, then the momentum of the load moving in the direction of the one conveyor is $mv$.

In order to change the direction of the moving load on the one conveyor to the direction on the other conveyor which is angularly spaced from the one conveyor and moving at the same speed as the original conveyor, first the speed of the load on the one conveyor must be reduced to zero in the direction of the motion of the one conveyor by applying to it a counterforce, corresponding to a frictional force equivalent to the momentum $mv$, and then a force equivalent to the original momentum $mv$ has to be applied to the plate in the direction of the other conveyor.

Inasmuch as a force is generally directly proportional to an acceleration in the same direction, a slip occurs between the load and the surface of the conveyor, causing scratches on the surface of the load, if the direction of the moving plate is changed from one direction to another by first reducing the original acceleration and then by increasing that in the new direction instantaneously and at the same time.

Assume that the mass of the floated article or plate is identified by $m$ and that the velocity of said plate, floatedly carried on the air cushion conveyor, is identified by $v$, the momentum thereof is equal to the product $mv$ of the mass $m$ and speed $v$. Assume further that the force for moving the plate is identified by $p$ and that the time required for reducing the speed $v$ to zero is identified by $t$, the force applied to the plate is equivalent to the product $pt$ of the force $p$ and the time $t$. Therefore, it will be noted that the product $mv$ is equal to $pt$, that is $mv=pt$. As will be clearly understood by those skilled in that art, if the frictional force between the plate on the air conveyor and the surface thereof is identified by $f$, the force $f$ may be applied to the above equation instead of the force $p$, that is $mv=ft$, alternatively $f=mv/t$.

If the time $t$ in the aforementioned equation $f=mv/t$ is decreased to zero, the force $f$ is increased to infinity. Thus, when the plate moving on the conveyor is rapidly decelerated in order to change its direction of movement, the time $t$ is caused to be decreased. As a result, the force applied to the plate as a result of the deceleration is increased thus causing scratches to occur on the bottom surface of the plate. In other words, in order to change the direction of the moving plate on the conveyor, a great amount of force must be applied to the plate so that the original speed of the plate is first reduced to zero and then so that the speed in the new direction is increased. Otherwise, slip will occur between the bottom surface of the plate and the conveyor.

This invention utilizes a particular characteristic such that if the above time $t$ is increased, the force $f$ will be decreased accordingly in the equation $f=mv/t$. In order to actually reduce the force $f$ when the direction of the plate is changed, the direction of the plate moving on the conveyor must be gradually changed toward the final direction. Thus, in this invention, the direction of the moving plate is changed so as to move it peripherally at a predetermined angular velocity.

Suppose that the moving plate is contacted by any arm of length $r$, at its one end pivotally secured to the conveyor frame or the like at the branching portion and at the other end pressing the plate so as to turn it gradually, and having an angular velocity identified by $\omega$, which is predetermined so as to have the relation $r\omega=v$ therebetween, and the plate has its direction changed from the X axis to the Y axis at a right angle to the X axis. Further, the component velocity corresponding to the X axis is identified by $v_x$, and that corresponding to the Y axis is identified by $v_y$. The time from the beginning of the direction change is identified by $t$. Then $$v_x = v \cos \omega t$$
$$v_y = v \sin \omega t$$

and, as is clearly understood by the above equations, the component speed along the original direction, that is along the axis, is gradually decreased while the angular movement of the plate is advanced, at the same time that along the Y axis is gradually increased while the angle of the change in direction is increased. Thus, this invention prevents a rapid increase or decrease in the force being applied to the plate when its direction of motion is changed at a branching portion in the conveyor system.

In such a case, as will be clearly understood by those skilled in the art, a centrifugal force $c$ to be applied to the plate in the horizontal plane is represented by the following equation, if the same reference characters are used:

$$c = mr\omega^2 \text{ or } Mv^2/r$$

According to one aspect of the present invention, there is provided an apparatus for changing a direction of gas floated articles carried on a gas cushion conveyor having a pair of arms horizontally, pivotally secured at a branching portion, which arms are adapted to turn in parallel, a pair of pads which are mounted to respective ends of the arms to be movable in elevation so as to press the article thereon, which pads are adapted to be turnable at the ends of the arms on a shaft pivotally secured thereto. Said shaft is supported by both inner and outer bosses thereby causing the pads to be independently turnable with respect to the shaft, and the arm is adapted to turn at a peripheral speed equivalent to the initial carrying speed on the conveyor, that is the product of the radius of the arm and the angular velocity thereof. Thus, according to the present invention, the articles are always carried at the same peripheral speed as the original velocity. The pads are adapted to substantially absorb the fluctuation of the article or differences in the thickness thereof.

According to another aspect of the present invention, there is provided an apparatus for changing a direction of gas floated articles carried on a gas cushion conveyor having curved arms which are adapted to be horizontally, pivotally secured at a branching portion and which arms are adapted to turn substantially in parallel. Pads which are adapted to be mounted to respective ends of the arms so as to be movable in elevation are further adapted to be automatically controlled so as to be lowered at the beginning of the direction change and to be raised at the end of said change. Means are provided for returning the arms to their original position after the completion of the direction change and connecting rods are mounted at opposite ends on the respective arms, said rods having a length substantially equal to the distance between the respective arms.

Although specific forms of the invention have been selected for illustration in the drawings, and the following description is drawn in specific terms for the purpose of describing those forms of the invention, this description is not intended to limit the scope of the invention, which is defined in the claims.

Referring now to the drawings, and particularly to FIGURE 1, in the explanatory plan view an apparatus for changing the direction of movement of articles such as flat plates on a conveyor is shown. The X—X axis is assumed to be laterally positioned in FIGURE 1, the Y—Y axis being at a right angle to the X—X axis. The article or flat plate is designated by reference numeral 1, which plate is originally moving on the X—X conveyor at speed $v$. The pads are designated by reference character 2, the arms are identified by numeral 3, and the shafts are designated by numeral 4. When the flat plate 1 moving along the X—X axis reaches the position identified by A in FIGURE 1, a pair of pads 2 (the number of pads not being limited to a pair) move downwardly to the upper surface of the plate 1 so as to press against it. Thereafter, the plate 1 is transferred so as to have its direction of movement changed by turning the arms 3 pivotally around the shaft 4 in the direction designated by Y—Y in such a manner that the peripheral speed of the pads 2 with the plate 1 is the same as the original speed $v$. After the direction of movement of the plate 1 is changed so that the plate 1 is positioned in position B, it is forced to continue moving at the same speed $v$.

As is explained heretofore, if the mass of the plate 1 is designated by $m$ the momentum of the plate 1 is determined by the product $mv$ of the mass $m$ and the velocity $v$ along the X—X axis direction. In the conventional manner of changing the moving direction of the plate 4, the frictional force $f$ corresponding the momentum $mv$ must at first be applied against the moving plate 1 so as to stop it along the X—X axis, then the force equivalent to the momentum $mv$ must be applied to the new moving direction along the Y—Y axis so as to move said plate at the same velocity as originally.

Since a force is generally directly proportional to an acceleration in the same direction, if the direction of the moving plate 1 is changed from the X—X axis direction to the Y—Y axis direction by first decelerating then accelerating in the new direction simultaneously and instantaneously, a slip occurs between the article or plate 4 and the surface of the conveyor which causes scratches on the bottom surface of the plate. In order to avoid this, it is necessary to restrain this slip by applying a great amount of pressing force. However, in the case where the direction of a plate such as a glass plate or a plastic or polished metal plate is changed, such a slip or great pressing force will easily create such scratches on the bottom surface of the plates that it would be impractical to use them.

In FIGURE 1, pads 2 are disposed so that they are in a position spaced from the center of the fulcrum or shaft 4 by the arms 3 which at one end are pivotally secured to the shaft 4 and at the other end are connected to pads 2 and pressing the plate 1 so as to change the direction of movement of said plate in the space or radius $r$ from the shaft to the pad, that is the length of the arm. The arm 3 is adapted to be turned at the angular speed $\omega$ so that the equation $v = r\omega$ is satisfied. As is discussed hereinbefore, the following equations are considered:

$$v_x = v \cos \omega t$$
$$v_y = v \sin \omega t$$

when the plate 1 turns from the direction of the X—X axis or zero degree to the direction of the Y—Y axis or 90 degrees, that is, from time zero to time $\pi/2\omega$ the component speed along the axis, $v_x$ decreases gradually and that along axis $v_y$ increases gradually until it is accelerated to the original speed $v$.

*Example*

Weight of the plate_____ 100 kg.
Length of the arm_____ 1.0 m.
Original speed $v$_____ 18 m./min. or 0.3 m./sec.
Acceleration due to gravity_ 9.8 m./sec.²

Centrifugal force $c$_____ $\dfrac{mv^2}{r} = \dfrac{100}{g} \times \dfrac{0.3^2}{1} =$
$\dfrac{100 \times 0.09}{9.8} \doteqdot 0.92$ kg.

From the above result, in this case, the centrifugal force is less than 1 kg. Suppose that the coefficient of the friction of the contacting surface between the pads and the surface of the conveyor is approx. 0.3, only 3 to 4 kg. or the like of the pressing force would be enough to catch the plate 1 so as to move or turn it to change its moving direction.

Figure 3:
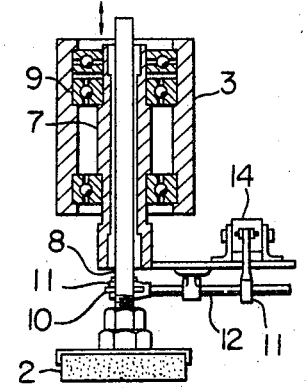
FIGURES 3 and 4 are partly sectional views taken on lines a—a and b—b, respectively which appear in FIGURE 2.
Figure 4:
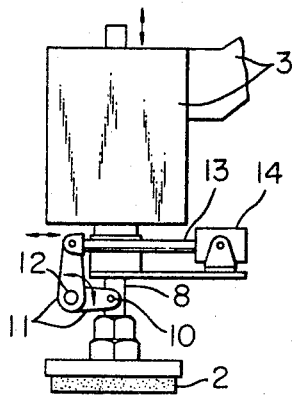
Figure 2:
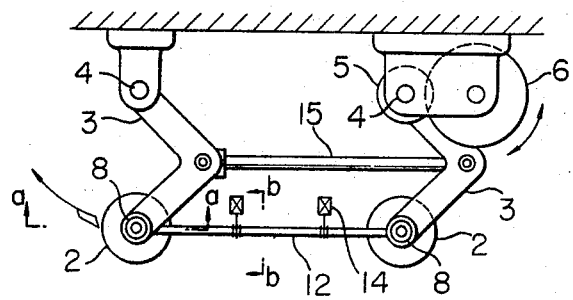
FIGURE 2 is a diagrammatic plan view showing the apparatus for changing the direction of movement of a moving article on a conveyor embodied by this invention.
Figure 5:
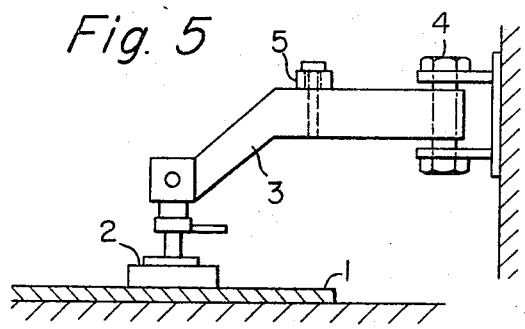
FIGURE 5 is a side view of the apparatus shown in FIGURE 4.

The structure of each part will now be explained hereinafter in FIGURE 2. A gear 5 is positioned on one of the shafts 4 and is meshingly engaged with a drive gear 6. Immediately before the flat plate 1 reaches position A, the turning, driving device is initiated to turn said drive gear 6. The arrangement of vertical shaft 8 to which the pads 2 are attached is illustrated in FIGURES 3, 4 and 5. The vertical shaft 8 is journalled in ball bearing 9 so as to be moveable up and down in an axial direction. One leg of a lever 11, pivotal about shaft 12, is connected to the vertical shaft 8 by means of a horizontal pin 10; the other leg of said lever 11 being connected to a piston rod 13 of an air cylinder 14. Thus, at the movement when the flat plate arrives in the position A, the air cylinder 14 is activated to lower the pads 2 so that they press against the upper surface of the plate.

In the present case, the frictional force between the flat plate floated on the air layer of the table surface, and the table is extremely small and that between the plate 1 and the pads 2 is sufficiently large, accordingly, the plate is firmly engaged by the apparatus and can be rotated by the movement of arm 3. Thus, when the flat plate 1 has been moved to position B, the air cylinder 14 is de-activated, raising the pads 2 from the plate 1. The driving gear 6 is then reversed to return the arm 3 to the initial position, and thereafter the same operation is repeated to change the direction of movement of the next flat plate 1.

The turning arm 3 shown in the drawings and connecting rod 15 always form a parallelogram so that the respective two arms remain parallel to one another during turning. However, only one pad 2 and arm 3 need be used for turning a small flat plate, or three or more may be used for a larger flat plate.

Thus in accordance with this invention the inertia of the flat plate in the first transferring direction may be transformed to turning energy which together with an added external force is used to reduce gradually the speed in the original direction in accordance with the cosine curve while at the same time, in accordance with the sine curve, gradually increasing the speed in the new direction. Accordingly, the direction of the flat plate may be changed easily and with a minimum power consumption. And further, it is easy to automatize the operation of the turning of the arm and the raising and lowering of the pads by using electric means such as a limit switch.

What is claimed is:

1. An apparatus for changing the direction of movement of gas floated articles carried on a gas cushion conveyor comprising a pair of arms horizontally, pivotally secured at one end at a branching portion of the conveyor, said two arms being adapted to turn substantially in parallel, a pair of pads being mounted on the respective other ends of said arms and movable in elevation so as to press an article on the conveyor, said pads being rotatably mounted on said other ends of the arms.

2. An apparatus as set forth in claim 1, wherein driving means are provided coupled to said arm at a peripheral speed equivalent to the initial carrying speed on said conveyor, which speed is the product of the radius of said arm and the angular velocity thereof, whereby said articles are always carried at the same peripheral speed as the original velocity.

3. An apparatus as set forth in claim 1, wherein said shaft is supported by inner and outer bosses, whereby said pad is independently turnable on said shaft.

4. An apparatus as set forth in claim 1 wherein said pads are movable on said arms toward and away from the surface of the conveyor to substantially absorb the fluctuation of said article or differences in the thickness thereof.

5. Apparatus for changing the direction of movement of gas floated articles carried on a gas cushion conveyor comprising a plurality of curved arms horizontally, pivotally secured at one end at a branching portion of the conveyor, said respective arms being adapted to turn substantially in parallel, pads being mounted on the respective other ends of said arms and movable in elevation, connecting rods being connected between said arms, said rods being substantially equal in length to the distance between the respective arms.

6. Apparatus as set forth in claim 5, wherein means are coupled to said arms for automatically controlling said arm and pads so as to lower the pads at the beginning of a direction change and to raise them at the end thereof and to return said arms to their original position.

References Cited

UNITED STATES PATENTS

| | | | |
|---|---|---|---|
| 2,527,394 | 10/1950 | Brown et al. | 302—29 |
| 2,793,693 | 5/1957 | Menk | 193—36 X |
| 3,138,408 | 6/1964 | Bruce et al. | 302—29 |
| 3,194,376 | 7/1965 | Holben | 193—36 |
| 3,198,499 | 8/1965 | Stanley | 302—29 |

ANDRES H. NIELSEN, *Primary Examiner.*